(12) United States Patent
Wang (10) Patent No.: US 6,194,977 B1
(45) Date of Patent: Feb. 27, 2001

(54) STATE VARIABLE-BASED TABLE-DRIVEN MODULATION SIGNAL GENERATION

(75) Inventor: Robert C. Wang, Mendham Township, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/072,813

(22) Filed: May 5, 1998

(51) Int. Cl.[7] .............................. H03C 3/00; H04L 27/20
(52) U.S. Cl. ..................... 332/103; 332/104; 375/283; 375/308
(58) Field of Search ................................. 332/103–105; 375/283, 308

(56) References Cited

U.S. PATENT DOCUMENTS

| | | | |
|---|---|---|---|
| 5,428,643 | * 6/1995 | Razzell | 375/308 |
| 5,512,865 | * 4/1996 | Fague | 332/103 |
| 5,604,770 | * 2/1997 | Fetz | 375/296 |
| 5,768,317 | * 6/1998 | Fague et al. | 375/296 |

* cited by examiner

Primary Examiner—David Mis (74) Attorney, Agent, or Firm—Steve Mendelsohn (57) ABSTRACT

Dibits (i.e., pairs of bits) in an input data stream are converted into a modulation signal (e.g., a π/4-DQPSK modulation signal) using a technique that relies on pre-computed filter output values to reduce the processing required to generate each sample in the modulation signal. The pre-computed filter output values are stored in one or more look-up tables, which are accessed in real time during signal conversion to retrieve values as needed. In one implementation, the dibits, which are represented by complex values in a complex symbol space, are converted into two streams of state variables: one stream for the even symbols and one stream for the odd symbols. In addition, a third stream of state variables identifies whether each of the corresponding symbols is an even symbol or an odd symbol. The three streams of state variables are used to generate address pointers that are used to access the pre-computed filter output values from the look-up tables. Addition/subtraction operations are then applied to the retrieved values to generate the real and imaginary parts of the complex samples in the modulation signal. By greatly reducing the computations involved in generating each complex sample in the modulation signal, the present invention can be used to reduce the costs of implementing the modulation process and/or increase the rate at which the input data stream is over-sampled, thereby reducing distortion in the modulation signal.

25 Claims, 4 Drawing Sheets

STATE VARIABLE-BASED TABLE-DRIVEN MODULATION SIGNAL GENERATION

BACKGROUND OF THE INVENTION

1. Field of the Invention

The present invention relates to signal processing, and, in particular, to π/4-differentially encoded quadrature phase-shifted keying (π/4-DQPSK) modulation.

2. Description of the Related Art

Figure 1:
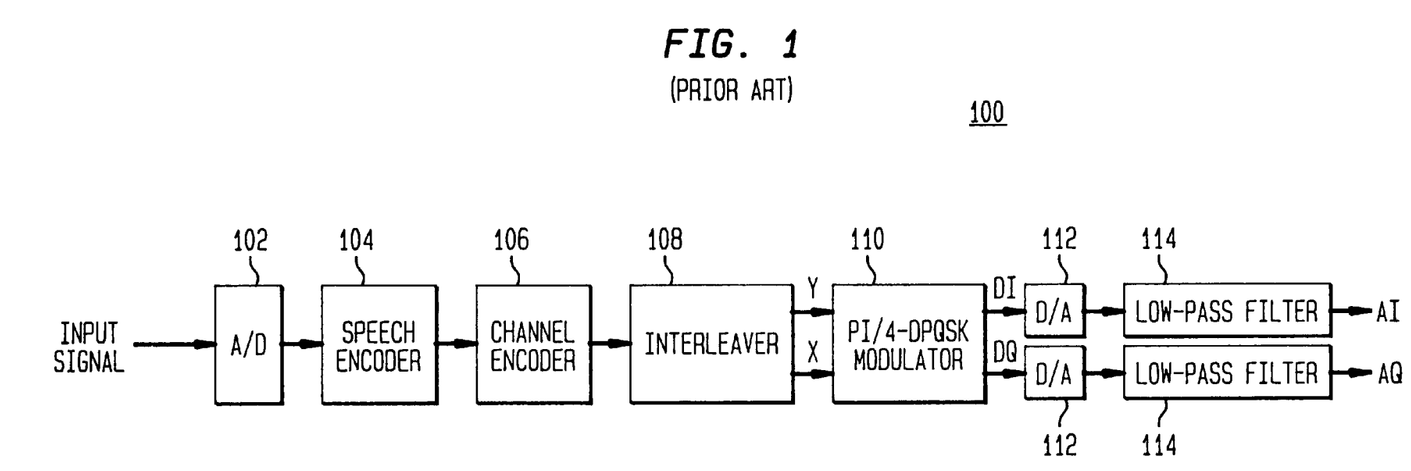
FIG. 1 shows a block diagram of a conventional digital system for encoding and modulating speech signals for transmission using π/4-DQPSK modulation.

FIG. 1 shows a block diagram of a conventional digital system 100 for encoding and modulating speech-related audio signals for transmission using π/4-DQPSK modulation. As shown in FIG. 1, analog-to-digital converter 102 digitizes the input signal, speech encoder 104 encodes the digitized stream, channel encoder 106 adds redundant bits to the encoded data, interleaver 108 interleaves the encoded data (to enable a receiver to perform error correction in the presence of burst errors in the transmitted signals), and modulator 110 applies π/4-DQPSK modulation to dibits (i.e., pairs of bits) in the interleaved data stream to generate multi-bit digital values DI and DQ corresponding to the in-phase (or real) and quadrature-phase (or imaginary) parts of the modulated signal. These two digital streams DI and DQ are converted to analog signals by digital-to-analog (D/A) converters 112, and the analog signals are then filtered by low-pass filters 114 to yield the two analog output signals AI and AQ corresponding to the in-phase and quadrature-phase parts of the modulated signal.

In π/4-DQPSK modulation, an input stream of dibits, represented by (y,x), is converted into a modulated output stream of complex values I+jQ, where I is the in-phase or real part and Q is the quadrature-phase or imaginary part of each complex value. In typical digital implementations, this conversion process involves the application of a computationally intense finite impulse response (FIR) filter to an over-sampled data stream to generate a stream of over-sampled interpolated complex values. The degree of over-sampling in the conversion process is often limited by the finite processing capabilities of the processor used to implement the modulation scheme. As such, the level of distortion in the modulated signals may be higher than desirable. Less distortion can be achieved by using more costly processors that have greater processing capabilities to handle higher levels of over-sampling.

SUMMARY OF THE INVENTION

The present invention is directed to a modulation scheme (e.g., π/4-DQPSK) that greatly simplifies the real-time computations involved in converting input data into modulated signals. As a result, for a given processor, the modulation scheme of the present invention can be implemented with a greater degree of over-sampling, thereby providing modulated signals with less distortion, than conventional π/4-DQPSK modulation schemes, without having to use more expensive processors.

According to one embodiment, the present invention is a method for generating phase-based modulation signals from an input data stream. In a phase-based modulation scheme, information is encoded as phase changes within the modulated signal. State variables are generated from sets of bits in the input data stream, and address pointers are generated using the state variables. Pre-computed values corresponding to filter outputs are retrieved from memory using the address pointers, and the modulation signals are generated by applying addition/subtraction operations to the pre-computed values. Using pre-computed filter-output values reduces the computational load, thereby allowing a greater degree of over-sampling for a given processor.

In another embodiment, differential state encoding is performed to generate state variables from sets of bits in the input data stream, and sample generation is performed to generate the modulation signals from the state variables. The sample generation comprises the steps of (1) updating registers using the state variables; (2) generating look-up table addresses from values in the registers; (3) retrieving from memory pre-computed values corresponding to filter outputs using the look-up table addresses; and (4) applying addition/subtraction operations to the pre-computed values to generate the modulation signals.

According to yet another embodiment, the present invention is an integrated circuit having a modulator for generating phase-based modulation signals from an input data stream. The circuit comprises (a) a differential state encoder adapted to generate state variables from sets of bits in the input data stream and (b) a sample generator adapted to generate the modulation signals from the state variables. The sample generator comprises (1) registers whose values are updated using on the state variables and whose values are used to generate look-up table addresses to retrieve from memory pre-computed values corresponding to filter outputs and (2) addition/subtraction operators adapted to generate the modulation signals from the pre-computed values.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 2:
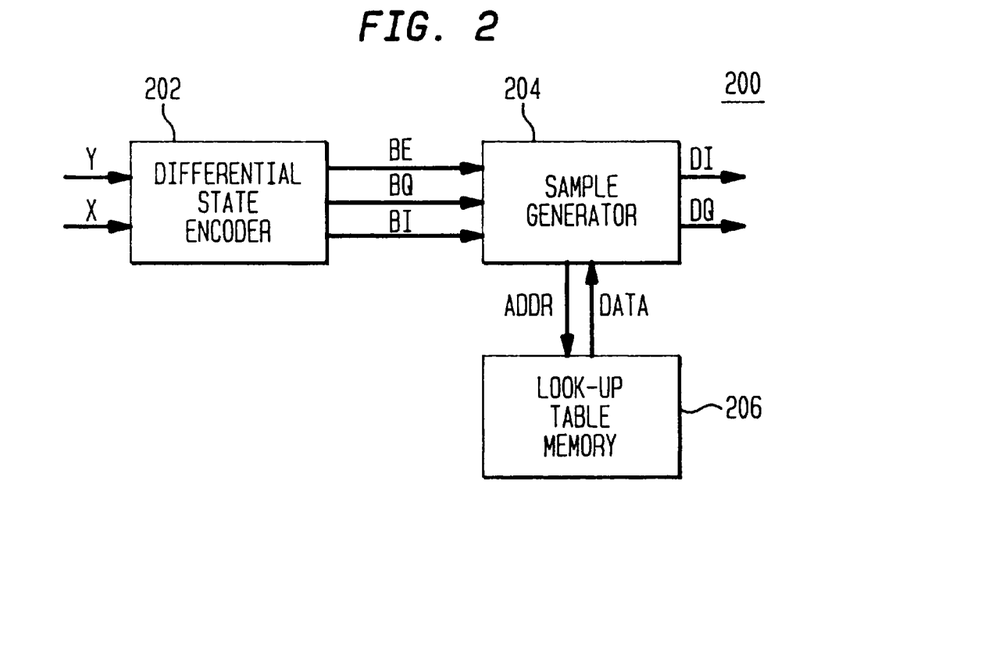
FIG. 2 shows a block diagram of a π/4-DQPSK modulator, according to one embodiment of the present invention.

FIG. 2 shows a block diagram of a π/4-DQPSK modulator 200, according to one embodiment of the present invention. Modulator 200 can be used in a digital system to modulate signals, such as speech signals. As such, modulator 200 can be used in place of conventional digital modulator 110 in system 100 of FIG. 1. Since modulator 200 performs digital processing, it may be implemented in software, firmware, hardware, or a combination thereof, on a suitable processing platform, such as a general-purpose microprocessor, a field programmable gate array (FPGA), a digital signal processor (DSP), or an application-specific integrated circuit (ASIC).

Modulator 200 comprises differential state encoder 202 and complex sample generator 204. Encoder 202 uses each input dibit (y,x) to update the state variable represented by three binary numbers (BE, BQ, BI), where bit BE identifies whether the dibit is at an even or odd symbol in the π/4-DQPSK constellation, and bits BI and BQ correspond to the in-phase signal I and quadrature-phase signal Q, respectively. The dibits are converted from a serial bit stream, starting from bit 1 in time of the serial stream. The x bits are the odd numbered bits and the y bits are the even numbered bits. Sample generator 204 uses the history of state variables (BE, BQ, BI) to generate multi-bit digital complex samples DI+jDQ, at a sampling rate that is a multiple of the symbol rate (i.e., over-sampling). Sample generator 204 uses the history of the state variables and clock signals as addresses to retrieve the pre-computed filter output values stored in one or more look-up tables stored in memory device 206 (e.g., read-only memory or ROM). Sample generator 204 then generates digital complex samples by performing four addition functions on the retrieved values. The operations in the sample generator perform the equivalent of interpolation and lowpass filtering functions. The filter used is a square-root raised cosine filter with a roll-off factor of 0.35 implemented as a finite impulse response (FIR) filter.

Differential State Encoding

In π/4-DQPSK modulation, each dibit (y,x) pattern specifies a phase change of the digital complex samples at the symbol intervals, I(n)+jQ(n), called symbol samples in this document. Table I defines the phase change values.

TABLE I

| DIBIT (y,x) | PHASE CHANGE |
|---|---|
| 00 | π/4 |
| 01 | 3π/4 |
| 10 | −π/4 |
| 11 | −3π/4 |

Figure 3:
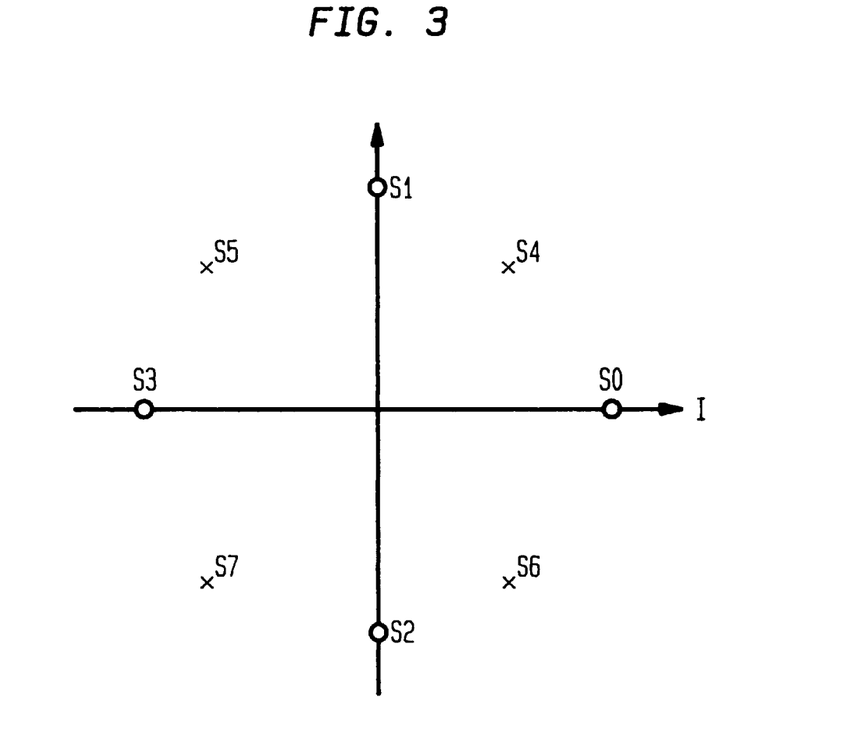
FIG. 3 shows a graphical representation of the constellation of symbols in π/4-DQPSK modulation.

Symbol samples, I(n)+jQ(n), move in the complex plane, governed by the input dibit stream. However, the trace of the symbol samples does not occupy the whole complex plane but only eight points which are labeled as S0, S1, ... , S7 in FIG. 3. For example, at time n, the symbol sample may be at point S4. With a new dibit (y,x)=(0,1), the symbol sample at time n+1 will be at point S3, with a phase change of 3π/4. Also, symbol samples move alternately between the set of odd symbols (i.e., S0, S1, S2, and S3) and the set of even symbols (i.e., S4, S5, S6, and S7). The values of points S0, S1, ... , S7, shown in Table II, are chosen so that they can be efficiently represented by three binary variables (BE, BQ, BI), which enables construction of compact look-up tables for filter output. The complex values of the even symbols can be written according to Equation (1) as follows:

$$(I + jQ)_{EVEN} = \frac{1}{\sqrt{2}}[(-1)^{BI} + j(-1)^{BQ}]. \quad (1)$$

where:

$$(-1)^{BI} = (1 - 2 \cdot BI) = \begin{cases} 1 & \text{if } BI = 0 \\ -1 & \text{if } BI = 1 \end{cases} \quad (2)$$

and $$(-1)^{BQ} = (1 - 2 \cdot BQ) = \begin{cases} 1 & \text{if } BQ = 0 \\ -1 & \text{if } BQ = 1 \end{cases} \quad (3)$$

TABLE II

| SYMBOL | COMPLEX VALUE (I + jQ) | STATE VARIABLE (BE, BQ, BI) |
|---|---|---|
| S0 | 1 | 000 |
| S1 | j | 001 |
| S2 | −j | 010 |
| S3 | −1 | 011 |
| S4 | 1/√2(1 + j) | 100 |
| S5 | 1/√2(−1 + j) | 101 |
| S6 | 1/√2(1 − j) | 110 |
| S7 | 1/√2(−1 − j) | 111 |

Table III lists the relationships between the state variables (BE, BQ, BI) for each possible combination of consecutive dibits in the input data stream, where the previous dibit is referred to as the old dibit and the current dibit is referred to as the new dibit.

TABLE III

| OLD | OLD STATE VARIABLES | | | NEW SYMBOL New Dibit (y, x) | | | | NEW | NEW BQ New Dibit (y, x) | | | | NEW BI New Dibit (y, x) | | | |
|---|---|---|---|---|---|---|---|---|---|---|---|---|---|---|---|---|
| Si | BE | BQ | BI | 00 | 01 | 10 | 11 | BE | 00 | 01 | 10 | 11 | 00 | 01 | 10 | 11 |
| S0 | 0 | 0 | 0 | S4 | S5 | S6 | S7 | 1 | 0 | 0 | 1 | 1 | 0 | 1 | 0 | 1 |
| S1 | 0 | 0 | 1 | S5 | S7 | S4 | S6 | 1 | 0 | 1 | 0 | 1 | 1 | 1 | 0 | 0 |
| S2 | 0 | 1 | 0 | S6 | S4 | S7 | S5 | 1 | 1 | 0 | 1 | 0 | 0 | 0 | 1 | 1 |
| S3 | 0 | 1 | 1 | S7 | S6 | S5 | S4 | 1 | 1 | 1 | 0 | 0 | 1 | 0 | 1 | 0 |
| S4 | 1 | 0 | 0 | S1 | S3 | S0 | S2 | 0 | 0 | 1 | 0 | 1 | 1 | 1 | 0 | 0 |
| S5 | 1 | 0 | 1 | S3 | S2 | S1 | S0 | 0 | 1 | 1 | 0 | 0 | 1 | 0 | 1 | 0 |
| S6 | 1 | 1 | 0 | S0 | S1 | S2 | S3 | 0 | 0 | 0 | 1 | 1 | 0 | 1 | 0 | 1 |
| S7 | 1 | 1 | 1 | S2 | S0 | S3 | S1 | 0 | 1 | 0 | 1 | 0 | 0 | 0 | 1 | 1 |

The transition to the new BQ and BI values can be written using the following logic equations. If the previous symbol is an odd symbol (i.e., $BE_{OLD}=0$), then:

$$BI_{NEW}=\bar{y}\cdot\bar{x}\cdot BI_{OLD}+\bar{y}\cdot x\cdot \overline{BQ_{OLD}}+y\cdot\bar{x}\cdot BQ_{OLD}+y\cdot x\cdot \overline{BI_{OLD}}=a \quad (4)$$

and $$BQ_{NEW}=\bar{y}\cdot\bar{x}\cdot BQ_{OLD}+\bar{y}\cdot x\cdot BI_{OLD}+y\cdot\bar{x}\cdot \overline{BI_{OLD}} \cdot y\cdot \overline{BQ_{OLD}}=b, \quad (5)$$

where "·" represents the logical AND operation, "+" represents the logical OR operation, and "overline" represents the logical complement. Otherwise, the previous symbol is an even symbol (i.e., $BE_{OLD}=1$) and $$BI_{NEW}=\overline{b} \qquad (6)$$

and $$BQ_{NEW}=a. \qquad (7)$$

In either case, $$BE_{NEW}=\overline{BE_{OLD}} \qquad (8)$$

In one embodiment of the present invention, differential state encoder 202 of FIG. 2 implements Equations (4)–(8) as needed to convert each dibit in the input data stream into the three state variables (BE, BQ, BI).

Sample Generation

Sample generator 204 converts the state variables (BE, BQ, BI), generated by differential state encoder 202, into a stream of digital complex samples DI+jDQ, at an over-sampling rate, where DI and DQ correspond to the in-phase (or real) part and quadrature-phase (or imaginary) part, respectively. Sample generator 204 interpolates the stream of symbol samples into a stream of digital complex samples, using an FIR square-root raised cosine filter with a roll-off factor of 0.35.

Figure 4:
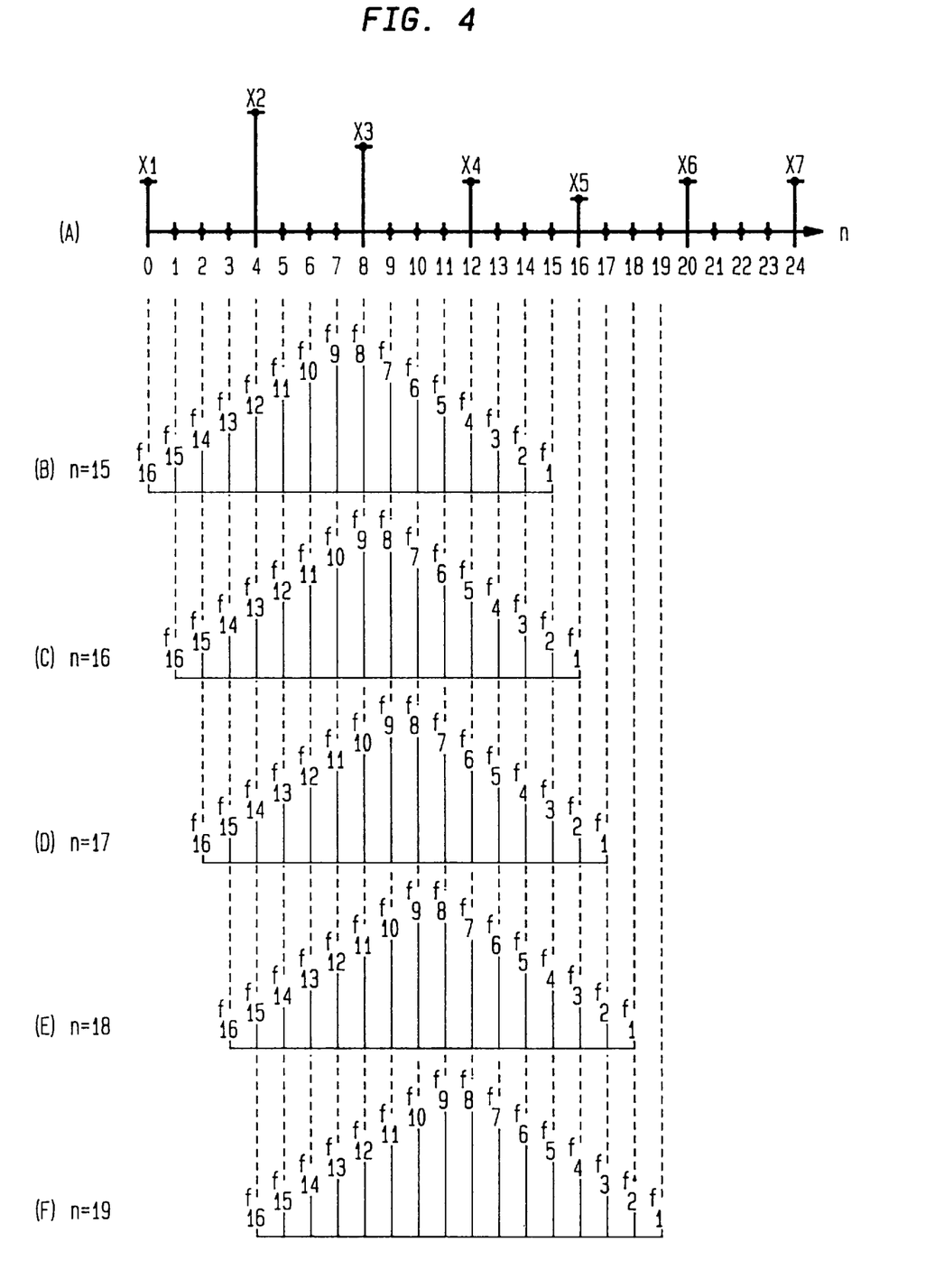
FIG. 4 shows graphical representations of the application of a 16-coefficient FIR filter to an input symbol stream for a sequence of consecutive time intervals.

FIR Filter Implemented as Poly-Phase Filters Applied to Even and Odd Symbol Streams FIG. 4 illustrates an example of the interpolation process in sample generator 204 of FIG. 3. Let x1, x2, x3, . . . represent the symbol samples that will be converted to a stream of samples, at four times the symbol rate. Note that Graph (A) in FIG. 4 shows x1, x2, . . . as real numbers for illustration purposes. Let x1, x3, x5, . . . be the odd symbols and x2, x4, x6, . . . be the even symbols. The FIR filter has a length of 16 coefficients. To interpolate the symbol samples, three samples having a value of 0 are inserted between every consecutive pair of symbol samples. The resulting over-sampled stream of samples is shown in Graph (A).

At every time interval n, the FIR filter, which has coefficients ($f_1, f_2, \ldots, f_6$), is applied to a corresponding portion of the over-sampled symbol stream of Graph (A). For example, Graph (B) corresponds to the application of the 16-coefficient FIR filter at time n=15, Graph (C) corresponds to the application of the 16-coefficient FIR filter at time n=–16, etc. The output of the FIR filter $F_{OUT}$ at time n=15 is given by Equation (9) as follows:

$$F_{OUT}(n=15) = f_{16} \cdot x1 + f_{12} \cdot x2 + f_8 \cdot x3 + f_4 \cdot x4, \qquad (9)$$

where the 12 other FIR coefficients are multiplied by zeros in the interpolated symbol stream. Grouping the odd symbols x1 and x3 and the even symbols x2 and x4, Equation (9) becomes:

$$F_{OUT}(n=15) = (f_{16} \cdot x1 + f_8 \cdot x3) + (f_{12} \cdot x2 + f_4 \cdot x4). \qquad (10)$$

Poly-phase filter ($f_{16}, f_8$) is applied to the odd symbols (x1,x3), and poly-phase filter ($f_{12}, f_4$) is applied to the even symbols (x2,x4). Similarly, the output of the conversion at time n=16 is given as follows:

$$F_{OUT}(n=16) = f_{13} \cdot x2 + f_9 \cdot x3 + f_5 \cdot x4 + f_1 \cdot x5, \qquad (11)$$

which can be rearranged into an odd and even parts as follows:

$$F_{OUT}(n=16) = (f_9 \cdot x3 + f_1 \cdot x5) + (f_{13} \cdot x2 + f_5 \cdot x4). \qquad (9)$$

Poly-phase filter ($f_9, f_1$) is applied to the odd symbols (x3, x5), and poly-phase filter ($f_{13}, f_5$) is applied to the even symbols (x2, x4). Repeating this process reveals that both the odd and even symbols go through the same sequence of the following eight poly-phase filters, although different filters are applied at different times: ($f_9, f_1$), ($f_{10}, f_2$), ($f_{11}, f_3$), ($f_{12}, f_4$), ($f_{13}, f_5$), ($f_{14}, f_6$), ($f_{15}, f_7$), and ($f_{16}, f_8$). The approach is to treat the odd and even symbols as two separate streams of samples and apply the poly-phase filters in a specific sequence.

Similar equations arranged in odd and even parts can be generated for each of the time periods n. These equations demonstrate the general principle that the application of an FIR filter to a symbol stream can be implemented by dividing the symbol stream into odd- and even-symbol streams, applying poly-phase filters to the odd- and even-symbol streams, and then combining the outputs of the poly-phase filters to generate the output of the FIR filter.

Even Symbol Representation

Referring back to Table II, for the even symbols S4, S5, S6, and S7, the real part I and imaginary part Q of the complex values $(I+jQ)_{EVEN}$ are either $1/\sqrt{2}$ or $-1/\sqrt{2}$. This binary situation makes it possible to express the complex values for the even symbols in terms of the binary state variables BI and BQ for the even symbols, according to Equation (13) as follows:

$$(I+jQ)_{EVEN} = \frac{1}{\sqrt{2}} [(-1)^{BI} + j(-1)^{BQ}]. \qquad (13)$$

Note that:

$$(-1)^{BI} = (1 - 2 \cdot BI) = \left\{ \begin{array}{ll} 1 & \text{if } BI = 0 \\ -1 & \text{if } BI = 1 \end{array} \right\} \qquad (14)$$

and $$(-1)^{BQ} = (1 - 2 \cdot BQ) = \left\{ \begin{array}{ll} 1 & \text{if } BQ = 0 \\ -1 & \text{if } BQ = 1 \end{array} \right\} \qquad (15)$$

The poly-phase filter applied to the even-symbol stream is represented by a set of N poly-phase filter coefficients denoted {c(0), c(1), . . . , c(N−1)}. The output of the poly-phase filter for the even-symbol inputs is represented by Equation (16) as follows:

$$DEI(n) + jDEQ(n) = \sum_{k=0}^{N-1} [I(n-k) + jQ(n-k)]_{EVEN} \cdot c(k) \qquad (16)$$

$$= \left[ \sum_{k=0}^{N-1} (-1)^{BI(n-k)} \cdot \left( \frac{c(k)}{\sqrt{2}} \right) \right] +$$

$$j \left[ \sum_{k=0}^{N-1} (-1)^{BQ(n-k)} \cdot \left( \frac{c(k)}{\sqrt{2}} \right) \right]$$

where n is the index of time points for the over-sampled data stream and $[I(n)+jQ(n)]_{EVEN}$ are the complex symbol samples corresponding to the even symbols.

In light of the relationships of Equations (14) and (15), the values DEI(n) and DEQ(n) in Equation (16) are sums of the terms $$\frac{\pm c(0)}{\sqrt{2}}, \frac{\pm c(1)}{\sqrt{2}}, \ldots, \frac{\pm c(N-1)}{\sqrt{2}},$$

where the plus or minus signs depend on the values of BI(n−k) and BQ(n−k). For a poly-phase filter having N coefficients, there are $2^N$ different possible combinations of BI(n–k) and BQ(n–k) and therefore $2^N$ corresponding values for DEI(n) and DEQ(n).

According to the present invention, the $2^N$ values for DEI(n) and DEQ(n) are pre-computed and stored in a look-up table in memory 206 of FIG. 2 for use by sample generator 204. In one embodiment, the pre-computed values are stored in memory 206 such that the look-up table addresses are based on the binary patterns for the $2^N$ different combinations of BI(n–k) and BQ(n–k). In particular, the address pointer AEI(n) is used to look up the pre-computed value for DEI(n), where address pointer AEI(n) is defined by the N most recent values for the state variable BI for the even-symbol stream, according to Equation (17) as follows:

$$AEI(n)=[BI(n),BI(n-1),\ldots,BI(n-N+1)]_{EVEN}. \qquad (17)$$

Similarly, the address pointer AEQ(n) is used to look up the pre-computed value for DEQ(n), where address pointer AEQ(n) is defined by the N most recent values for the state variable BQ for the even-symbol stream, according to Equation (18) as follows:

$$AEQ(n)=[BQ(n),BQ(n-1),\ldots,BQ(n-N+1)]_{EVEN}. \qquad (18)$$

Rather than performing the computations of Equation (16) in real time (i.e., during the actual filtering process), for each new symbol, sample generator 204 simply updates address buffers (e.g., first-in first-out shift registers) maintained for the address pointers AEI(n) and AEQ(n) and uses those address pointers to retrieve the corresponding, pre-computed values for DEI(n) and DEQ(n), respectively, from look-up table memory 206.

Odd Symbol Representation

As shown in FIG. 3, the odd and even symbols differ by 45°. As such, the complex symbol sample corresponding to odd symbols can be represented by rotating the complex symbol sample corresponding to even symbols by −45° of −π/4 radians, as represented by Equation (19) as follows:

$$(I+jQ)_{ODD}=(I+jQ)_{EVEN}\cdot e^{-j\pi/4} \qquad (19)$$

Substituting Equation (13) into Equation (19) yields Equation (20) as follows:

$$(I+jQ)_{ODD} = \frac{1}{\sqrt{2}}[(-1)^{BI} + j(-1)^{BQ}]\cdot e^{-j\pi/4} \qquad (20)$$

Expanding the exponential term in Equation (20) yields Equation (21) as follows:

$$(I+jQ)_{ODD} = \frac{1}{2}[(-1)^{BI} + j(-1)^{BQ}]\cdot (1-j) \qquad (21)$$

The poly-phase filter applied to the odd-symbol stream is represented by a set of N poly-phase filter coefficients denoted $\{d(0),d(1),\ldots,d(N-1)\}$. The output of the poly-phase filter for the odd-symbol inputs is represented by Expression (22) as follows:

$$\sum_{k=0}^{N-1}[I(n-k)+jQ(n-k)]_{ODD}\cdot d(k) \qquad (22)$$

where n is the index of time points for the over-sampled data and $[I(n)+jQ(n)]_{ODD}$ are the complex symbol samples corresponding to the odd symbols.

Substituting Equation (21) into Expression (22) yields Expression (23) as follows:

$$\sum_{k=0}^{N-1}\frac{1}{2}[(-1)^{BI(n-k)} + j(-1)^{BQ(n-k)}]\cdot (1-j)\cdot d(k) \qquad (23)$$

Rearranging Expression (23) yields Expression (24) as follows:

$$\left(\left[\sum_{k=0}^{N-1}(-1)^{BI(n-k)}\cdot\left(\frac{d(k)}{2}\right)\right] + j\left[\sum_{k=0}^{N-1}(-1)^{BQ(n-k)}\cdot\left(\frac{d(k)}{2}\right)\right]\right)\cdot (1-j) \qquad (24)$$

Let DOI(n) and DOQ(n) represent the real and imaginary parts inside the parentheses in Expression (24), according to Equations (25) and (26) as follows:

$$DOI(n) = \sum_{k=0}^{N-1}(-1)^{BI(n-k)}\cdot\left(\frac{d(k)}{2}\right) \qquad (25)$$

and $$DOQ(n) = \sum_{k=0}^{N-1}(-1)^{BQ(n-k)}\cdot\left(\frac{d(k)}{2}\right) \qquad (26)$$

Assuming that the even- and odd-symbol poly-phase filters have the same coefficients, the expressions for DOI(n) and DOQ(n) in Equations (25) and (26) differ from the expressions for DEI(n) and DEQ(n) in Equation (16) by $1/\sqrt{2}$.

Substituting Equations (25) and (26) into Expression (24) and then rearranging terms yields Expression (27) for the output of the poly-phase filter for the odd-symbol inputs, as follows:

$$(DOI(n)+j\cdot DOQ(n))\cdot(1-j)=(DOQ(n)+DOI(n))+j\cdot(DOQ(n)-DOI(n)) \qquad (27)$$

Thus, the real part of the FIR filter output is the sum of DOQ(n) and DOI(n) and the imaginary part of the FIR filter output is the difference between DOQ(n) and DOI(n).

As was the case for DEI(n) and DEQ(n) in Equation (16), there are $2^N$ different combinations of BI(n–k) and BQ(n–k) in Equations (25) and (26) and therefore $2^N$ corresponding values for DOI(n) and DOQ(n). These $2^N$ values can be pre-computed and stored in a look-up table in memory 206, and sample generator 204 can retrieve the appropriate values during real-time signal processing. As before, in one embodiment, the pre-computed values are stored in memory 206 such that the addresses are based on the binary patterns for the $2^N$ different combinations of BI(n–k) and BQ(n–k). In particular, the address pointer AOI(n) is used to look up the pre-computed value for DOI(n), where address pointer AOI(n) is defined by the N most recent values for the state variable BI for the odd-symbol stream, according to Equation (28) as follows:

$$AOI(n)=[BI(n), BI(n-1),\ldots, BI(n-N+1)]_{ODD}. \qquad (28)$$

Similarly, the address pointer AOQ(n) is used to look up the pre-computed value for DOQ(n), where address pointer AOQ(n) is defined by the N most recent values for the state variable BQ for the even-symbol stream, according to Equation (29) as follows:

$$AOQ(n)=[BQ(n), BQ(n-1),\ldots, BQ(n-N+1)]_{ODD}. \qquad (29)$$

Depending on the trade-off between memory space and processing time, sample generator 204 can either access a unique look-up table for the odd-symbol stream or access the same look-up table used for the even-symbol stream and then adjust the values by the $1/\sqrt{2}$ factor between the even-symbol terms and the odd-symbol terms. Where processing speed is more important than memory usage, each filter accesses its own pre-computed look-up table having $2^N$ entries.

Combining Poly-Phase Filter Outputs

The output $(DI(n)+jDQ(n))$ of the 2N-coefficient FIR filter is the sum of the output $(DEI(n)+jDEQ(n))$ from the even-symbol poly-phase filter and the output $((DOQ(n)+DOI(n)+j(DOQ(n)-DOI(n)))$ from the odd-symbol poly-phase filter, as represented by Equations (30) and (31) as follows:

$$DI(n)=DEI(n)+DOQ(n)+DOI(n) \qquad (30)$$

and $$DQ(n)=DEQ(n)+DOQ(n)-DOI(n). \qquad (31)$$

As described in the previous sections, the entire processing of sample generator 204 can be implemented for each over-sampled symbol by (1) updating 4 shift registers (based on Equations (17), (18), (28), and (29)), (2) retrieving 4 pre-computed values from memory (based on the addresses in the shift registers), and (3) performing three addition/subtraction functions (based on Equations (30) and (31)).

Because of the simple operations involved, for a given processing platform, the present invention should be able to support greater over-sampling rates than those supported by conventional techniques in which FIR filter computations are performed in real time as the signals are modulated. For example, in a application in which the input data stream contains 24.3K dibits per second (i.e., 24,300 dibits per second), an over-sampling rate of 32 samples/symbol results in a modulation signal containing 777.6K samples per second. Implementation on a typical field programmable gate array (FPGA) may be able to support an over-sampling rate of 64 samples/symbol. As a result, distortion in the modulated signals can be greatly reduced.

Sample Generator Circuit

Figure 5:
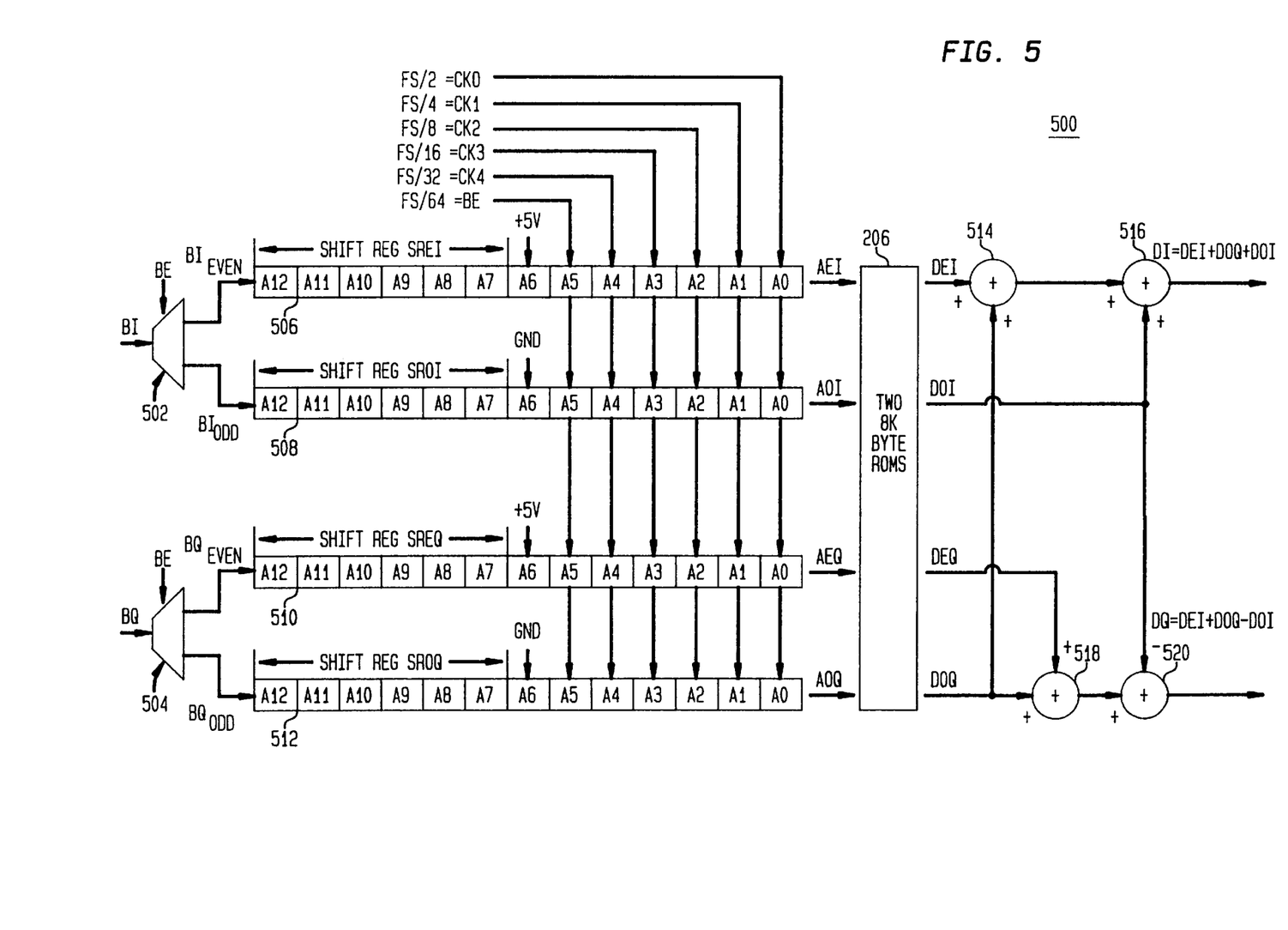
FIG. 5 shows a schematic diagram of a hardware circuit implementation of the sample generator of the modulator of FIG. 2.

FIG. 5 shows a schematic diagram of part of an integrated circuit 500 corresponding to a relatively low-cost hardware implementation of sample generator 204 and memory 206 of FIG. 2, according to one embodiment of the present invention. Circuit 500 is based on an over-sampling rate of 32 samples/symbol with a low-pass FIR filter having a square-root raised cosine response with a roll-off factor of 0.35. Circuit 500 has two 1:2 demultiplexers 502 and 504, four 13-bit registers 506–512, four adders 514–520, with memory 206 having two 8-Kbyte ROMs. Within each register 506–512, bits A0–A4 are controlled by clock signals that are based on the output sample rate $F_s$ as specified in FIG. 5, bit A5 is tied to the state variable BE, bit A6 is hardwired either high (e.g., +5V) or low (e.g., GND), and bits A7–A12 function as shift registers where bits enter at bit A12 and exit at bit A7.

As differential state encoder 202 of FIG. 2 generates the three state variables (BE, BQ, BI) for the even and odd symbols in the input data stream, the BI values for the even symbols are applied to shift register SREI of register 506, the BI values for the odd symbols are applied to shift register SROI of register 508, the BQ values for the even symbols are applied to shift register SREQ of register 510, and the BQ values for the odd symbols are applied to shift register SROQ of register 512. The application of the BI and BQ values to the shift registers is controlled by demuxes 502 and 504, which operate as switches controlled by state variable BE, which indicates whether the current symbol is an even symbol or an odd symbol.

Every time a new symbol is encountered in the input data stream, two shift registers are updated—either SREI and SREQ for an even symbol or SROI and SROQ for an odd symbol. The clock signals are synchronized with each symbol in the input data stream, such that, whenever a new symbol is encountered and two shift registers are updated, the values in bits A0–A4 are all zeros. These five bits will toggle according to their controlling clock signals such that the values in bits A0–A4 run from all zeros to all ones in binary increments before the next symbol in the input data stream is encountered.

At every clock cycle based on the sample rate $F_s$, the 13-bit values in two of the registers (e.g., either registers 506 and 508 or registers 510 and 512) are used as look-up table addresses to retrieve data from the two 8-Kbyte ROMs of memory 206. Thus, for every symbol in the data stream, $2^5$ or 32 different table look-ups are performed for each set of bits stored in each shift register. The hardwiring of the A6 bits either high or low ensures that the proper data is retrieved, where bit A6 high corresponds to the values pre-computed using Equation (16) for the even symbols and bit A6 low corresponds to the values pre-computed using Equations (25) and (26) for the odd symbols.

The values retrieved from the look-up tables are then combined appropriately by adders 514–520 in accordance with Equations (30) and (31) to generate the outputs DI and DQ of sample generator 204.

Circuit 500 of FIG. 5 is just one possible hardware implementation of the present invention for the particular over-sampling rate of 32 samples/symbol and a particular number of coefficients in FIR filter. Other hardware implementations are also possible for this over-sampling rate and FIR filter. In addition, the present invention can be implemented in software or in a combination of software and hardware. Moreover, the present invention can be implemented for other FIR filters and other sampling rates, including sampling at the symbol rate.

Although the present invention has been described in the context of $\pi/4$-DQPSK modulation of a symbol stream, in which each symbol corresponds to a dibit, those skilled in the art will understand that the present invention can be applied to phase-based modulation schemes other than $\pi/4$-DQPSK and/or to symbol streams having other than 2-bit symbols.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for generating phase-based modulation signals from an input data stream, comprising the steps of:
   (a) generating state variables from sets of bits in the input data stream, wherein:
      each set of bits in the input data stream corresponds to a symbol: and
      for each symbol in the input data stream;
         a first state variable BE identifies whether the symbol is an even symbol or an odd symbol;
         a second state variable BI corresponds to the real part of a complex value representing the symbol; and
         a third state variable BQ corresponds to the imaginary part of the complex value;

(b) generating address pointers using the state variables;

(c) retrieving from memory pre-computed values corresponding to filter outputs using the address pointers; and (d) generating the modulation signals by applying arithmetic operations to the pre-computed values.

2. The invention of claim 1, wherein the phase-based modulation signals are π/4-DQPSK modulation signals and each set of bits is a dibit.

3. The invention of claim 1, wherein the method is implemented in software.

4. The invention of claim 1, wherein the method is implemented in hardware.

5. The invention of claim 1, wherein:

the input data stream is generated by digitizing an analog audio input signal, applying speech and channel encoding to the digitized signal, and interleaving the encoded signal; and digital-to-analog conversion and low-pass filtering are applied to the modulation signals.

6. The invention of claim 1, wherein the pre-computed values correspond to poly-phase filter outputs.

7. The invention of claim 6, wherein:

the symbol stream is divided into an even-symbol stream and an odd-symbol stream; and the pre-computed values correspond to the separate application of poly-phase filters to the even-symbol stream and to the odd-symbol stream.

8. The invention of claim 1, wherein:

the state variables $BE_{OLD}$, $BI_{OLD}$, and $BQ_{OLD}$ correspond to a previous symbol in the input data stream;

a new symbol in the data stream corresponds to a pair of bits (y,x);

when the new symbol is an odd symbol in the input data stream, the second state variable $BI_{NEW}$ for the new symbol is determined based on the following equation:

$$BI_{NEW} = \bar{y} \cdot \bar{x} \cdot BI_{OLD} + \bar{y} \cdot x \cdot \overline{BQ_{OLD}} + y \cdot \bar{x} \cdot BQ_{OLD} + y \cdot x \cdot \overline{BI_{OLD}} = a$$

and the third state variable $BQ_{NEW}$ for the new symbol is determined based on the following equation:

$$BQ_{NEW} = \bar{y} \cdot \bar{x} \cdot BQ_{OLD} + \bar{y} \cdot x \cdot BI_{OLD} + y \cdot \bar{x} \cdot \overline{BI_{OLD}} + y \cdot x \cdot \overline{BQ_{OLD}} = b,$$

where "·" represents the logical AND operation, "+" represents the logical OR operation, and "overline" represents the logical complement;

when the new symbol is an even symbol in the input data stream, the second state variable $BI_{NEW}$ for the new symbol is determined based on the following equation:

$$BI_{NEW} = \bar{b}$$

and the third state variable $BQ_{NEW}$ for the new symbol is determined based on the following equation:

$$BQ_{NEW} = a.$$

9. The invention of claim 1, wherein:

the symbol stream is divided into an even-symbol stream and an odd-symbol stream;

a first address pointer AEI(n) is generated using the second state variable BI for symbols in the even-symbol stream;

a second address pointer AEQ(n) is generated using the third state variable BQ for symbols in the even-symbol stream;

a third address pointer AOI(n) is generated using the second state variable BI for symbols in the odd-symbol stream;

a fourth address pointer AOQ(n) is generated using the third state variable BQ for symbols in the odd-symbol stream;

the first address pointer AEI(n) is used to retrieve a first pre-computed value DEI(n) from memory;

the second address pointer AEQ(n) is used to retrieve a second pre-computed value DEQ(n) from memory;

the third address pointer AOI(n) is used to retrieve a third pre-computed value DOI(n) from memory;

the fourth address pointer AOQ(n) is used to retrieve a fourth pre-computed value DOQ(n) from memory;

a real part DI(n) of the modulation signals is generated based on the following equation:

$$DI(n) = DEI(n) + DOQ(n) + DOI(n);$$

and an imaginary part DQ(n) of the modulation signals is generated based on the following equation:

$$DQ(n) = DEQ(n) + DOQ(n) - DOI(n).$$

10. The invention of claim 9, wherein:

the first pre-computed value DEI(n) is based on the following equation:

$$DEI(n) = \left[\sum_{k=0}^{N-1} (-1)^{BI(n-k)} \cdot \left(\frac{c(k)}{\sqrt{2}}\right)\right];$$

the second pre-computed value DEQ(n) is based on the following equation:

$$DEQ(n) = \left[\sum_{k=0}^{N-1} (-1)^{BQ(n-k)} \cdot \left(\frac{c(k)}{\sqrt{2}}\right)\right];$$

the third pre-computed value DOI(n) is based on the following equation:

$$DOI(n) = \sum_{k=0}^{N-1} (-1)^{BI(n-k)} \cdot \left(\frac{d(k)}{2}\right);$$

the fourth pre-computed value DOQ(n) is based on the following equation:

$$DOQ(n) = \sum_{k=0}^{N-1} (-1)^{BQ(n-k)} \cdot \left(\frac{d(k)}{2}\right),$$

where c(k) and d(k) represent the coefficients of poly-phase filters.

11. The invention of claim 9, wherein, in addition to being functions of the corresponding state variables, the address pointers AEI(n), AEQ(n), AOI(n), and AOQ(n) are generated using clock signals to achieve over-sampling of the input data stream.

12. The invention of claim 1, wherein the arithmetic operations are composed of addition and subtraction operations.

13. A method for generating phase-based modulation signals from an input data stream, comprising the steps of:

(a) performing differential state encoding to generate state variables from sets of bits in the input data stream, wherein:
   each set of bits in the input data stream corresponds to a symbol; and
   for each symbol in the input data stream:
      a first state variable BE identifies whether the symbol is an even symbol or an odd symbol;
      a second state variable BI corresponds to the real part of a complex value representing the symbol; and
      a third state variable BQ corresponds to the imaginary part of the complex value; and (b) performing sample generation to generate the modulation signals from the state variables, wherein the sample generation comprises the steps of:
   (1) updating registers using the state variables;
   (2) generating look-up table addresses from values in the registers;
   (3) retrieving from memory pre-computed values corresponding to filter outputs using the look-up table addresses; and
   (4) applying arithmetic operations to the pre-computed values to generate the modulation signals.

14. The invention of claim 13, wherein the arithmetic operations are composed of addition and subtraction operations.

15. An integrated circuit having a modulator for generating phase-based modulation signals from an input data stream, comprising:

(a) a differential state encoder adapted to generate state variables from sets of bits in the input data stream, wherein:
   each set of bits in the input data stream corresponds to a symbol; and
   for each symbol in the input data stream:
      a first state variable BE identifies whether the symbol is an even symbol or an odd symbol;
      a second state variable BI corresponds to the real part of a complex value representing the symbol; and
      a third state variable BQ corresponds to the imaginary part of the complex value; and (b) a sample generator adapted to generate the modulation signals from the state variables, wherein the sample generator comprises:
   (1) registers whose values are updated using on the state variables and whose values are used to generate look-up table addresses to retrieve from memory pre-computed values corresponding to filter outputs; and
   (2) arithmetic operators adapted to generate the modulation signals from the precomputed values.

16. The invention of claim 15, wherein the phase-based modulation signals are $\pi/4$-DQPSK modulation signals and each set of bits is a dibit.

17. The invention of claim 15, wherein:
the input data stream is generated by digitizing an analog audio input signal, applying speech and channel encoding to the digitized signal, and interleaving the encoded signal; and
digital-to-analog conversion and low-pass filtering are applied to the modulation signals.

18. The invention of claim 15, wherein the pre-computed values correspond to poly-phase filter outputs.

19. The invention of claim 18, wherein:
the symbol stream is divided into an even-symbol stream and an odd-symbol stream; and
the pre-computed values correspond to the separate application of poly-phase filters to the even-symbol stream and to the odd-symbol stream.

20. The invention of claim 15, wherein:
the state variables $BE_{OLD}$, $BI_{OLD}$, and $BQ_{OLD}$ correspond to a previous symbol in the input data stream;
a new symbol in the data stream corresponds to a pair of bits (y,x);
when the new symbol is an odd symbol in the input data stream, the second state variable $BI_{NEW}$ for the new symbol is determined based on the following equation:

$$BI_{NEW}=\bar{y}\cdot\bar{x}\cdot BI_{OLD}+\bar{y}\cdot x\cdot\overline{BQ_{OLD}}+y\cdot\bar{x}\cdot BQ_{OLD}+y\cdot x\cdot\overline{BI_{OLD}}=a$$

and the third state variable $BQ_{NEW}$ for the new symbol is determined based on the following equation:

$$BQ_{NEW}=\bar{y}\cdot\bar{x}\cdot BQ_{OLD}+\bar{y}\cdot x\cdot BI_{OLD}+y\cdot\bar{x}\cdot\overline{BI_{OLD}}+y\cdot x\cdot\overline{BQ_{OLD}}=b,$$

where "·" represents the logical AND operation, "+" represents the logical OR operation, and "overline" represents the logical complement;

when the new symbol is an even symbol in the input data stream, the second state variable $BI_{NEW}$ for the new symbol is determined based on the following equation:

$$BI_{NEW}=\bar{b}$$

and the third state variable $BQ_{NEW}$ for the new symbol is determined based on the following equation:

$$BQ_{NEW}=a.$$

21. The invention of claim 15, wherein:
the symbol stream is divided into an even-symbol stream and an odd-symbol stream;
a first address pointer AEI(n) is generated using the second state variable BI for symbols in the even-symbol stream;
a second address pointer AEQ(n) is generated using the third state variable BQ for symbols in the even-symbol stream;
a third address pointer AOI(n) is generated using the second state variable BI for symbols in the odd-symbol stream;
a fourth address pointer AOQ(n) is generated using the third state variable BQ for symbols in the odd-symbol stream;
the first address pointer AEI(n) is used to retrieve a first pre-computed value DEI(n) from memory;
the second address pointer AEQ(n) is used to retrieve a second pre-computed value DEQ(n) from memory;
the third address pointer AOI(n) is used to retrieve a third pre-computed value DOI(n) from memory;
the fourth address pointer AOQ(n) is used to retrieve a fourth pre-computed value DOQ(n) from memory;
a real part DI(n) of the modulation signals is generated based on the following equation:

$$DI(n)=DEI(n)+DOQ(n)+DOI(n);$$

and an imaginary part DQ(n) of the modulation signals is generated based on the following equation:

$$DQ(n)=DEQ(n)+DOQ(n)-DOI(n).$$

22. The invention of claim 21, wherein:

the first pre-computed value DEI(n) is based on the following equation:

$$DEI(n) = \left[\sum_{k=0}^{N-1}(-1)^{BI(n-k)} \cdot \left(\frac{c(k)}{\sqrt{2}}\right)\right];$$

the second pre-computed value DEQ(n) is based on the following equation:

$$DEQ(n) = \left[\sum_{k=0}^{N-1}(-1)^{BQ(n-k)} \cdot \left(\frac{c(k)}{\sqrt{2}}\right)\right];$$

the third pre-computed value DOI(n) is based on the following equation:

$$DOI(n) = \sum_{k=0}^{N-1}(-1)^{BI(n-k)} \cdot \left(\frac{d(k)}{2}\right);$$

the fourth pre-computed value DOQ(n) is based on the following equation:

$$DOQ(n) = \sum_{k=0}^{N-1}(-1)^{BQ(n-k)} \cdot \left(\frac{d(k)}{2}\right),$$

where c(k) and d(k) represent the coefficients of poly-phase filters.

23. The invention of claim 21, wherein, in addition to being functions of the corresponding state variables, the address pointers AEI(n), AEQ(n), AOI(n), and AOQ(n) are generated using clock signals to achieve over-sampling of the input data stream.

24. The invention of claim 15, wherein the sample generator has (A) less than five shift registers, wherein each shift register comprises multiple registers and (B) less than five adders/subtractors, wherein each adder/subtractor comprises multiple addition/subtraction operators.

25. The invention of claim 15, wherein the arithmetic operators are addition and subtraction operators.

* * * * *